: US 10,513,169 B2
(45) Date of Patent: Dec. 24, 2019

(54) WEATHER STRIP FOR AUTOMOBILE

(71) Applicant: NISHIKAWA RUBBER CO., LTD., Hiroshima-shi, Hiroshima-ken (JP)

(72) Inventor: Hirofumi Ogawa, Hiroshima (JP)

(*) Notice: Subject to any disclaimer, the term of this patent is extended or adjusted under 35 U.S.C. 154(b) by 150 days.

(21) Appl. No.: 15/696,063

(22) Filed: Sep. 5, 2017

(65) Prior Publication Data

US 2018/0065455 A1 Mar. 8, 2018

(30) Foreign Application Priority Data

Sep. 5, 2016 (JP) .................................. 2016-172897
Aug. 8, 2017 (JP) .................................. 2017-153378

(51) Int. Cl.
*B60J 10/16* (2016.01)
*B60J 10/277* (2016.01)
*B60J 10/17* (2016.01)
*B60J 10/24* (2016.01)
*B60J 10/32* (2016.01)
*B60J 10/84* (2016.01)

(52) U.S. Cl.
CPC .............. *B60J 10/16* (2016.02); *B60J 10/17* (2016.02); *B60J 10/24* (2016.02); *B60J 10/277* (2016.02); *B60J 10/32* (2016.02); *B60J 10/84* (2016.02)

(58) Field of Classification Search
CPC ................................. B60J 10/16; B60J 10/277
See application file for complete search history.

(56) References Cited

U.S. PATENT DOCUMENTS

| 4,617,220 A * | 10/1986 | Ginster | E06B 7/2309 428/122 |
| 6,439,641 B1 * | 8/2002 | Anders | B60J 10/24 296/107.04 |
| 6,647,667 B2 * | 11/2003 | Mine | B60J 10/22 49/490.1 |
| 6,684,574 B2 * | 2/2004 | Hayashi | B60J 10/18 49/490.1 |
| 6,739,094 B1 * | 5/2004 | Berry | B60J 10/24 49/478.1 |
| 6,848,218 B2 * | 2/2005 | Langemann | B60J 10/18 296/146.9 |
| 6,849,310 B2 * | 2/2005 | Willett | B60J 10/80 296/93 |

(Continued)

FOREIGN PATENT DOCUMENTS

JP 59040958 A * 3/1984 ............. B60J 10/24
JP 07137583 A 5/1995

*Primary Examiner* — Catherine A Kelly
(74) *Attorney, Agent, or Firm* — Holtz, Holtz & Volek PC

(57) ABSTRACT

An installation base member couples to an opening of an automobile body and has a substantially U-shaped cross section. A hollow seal member includes a first base root and a second base root which extend from an outer-cabin side wall of the installation base member. The hollow seal member in cross section protrudes from the first base root outwardly to a first turning point, curves toward a base root of the flange and connects with the second base root. A side of the first base root includes solid (dense) material. An interval between the first and the second base roots includes sponge material. A first border between the solid (dense) material of the side of the first base root and the sponge material is closer to an exterior of the automobile than the first turning point.

20 Claims, 7 Drawing Sheets

(56) References Cited

U.S. PATENT DOCUMENTS

| | | | | |
|---|---|---|---|---|
| 6,889,472 B2* | 5/2005 | Nozaki | ............... | B60J 10/22 49/475.1 |
| 6,896,268 B2* | 5/2005 | Hofmann | ............... | B60J 10/00 200/61.43 |
| 6,935,072 B2* | 8/2005 | Kogiso | ............... | B60J 10/22 49/475.1 |
| 7,252,294 B2* | 8/2007 | Yamada | ............... | B60J 10/24 277/641 |
| 7,669,370 B2* | 3/2010 | Oba | ............... | B60J 10/24 49/475.1 |
| 7,735,263 B2* | 6/2010 | Oba | ............... | B60J 10/24 49/490.1 |
| 8,225,554 B2* | 7/2012 | Nozaki | ............... | B60J 10/24 49/475.1 |
| 9,056,543 B2* | 6/2015 | Lee | ............... | B60J 10/248 |
| 9,415,670 B2* | 8/2016 | Masumoto | ............... | B60J 10/24 |
| 9,759,003 B2* | 9/2017 | Hirakawa | ............... | E05F 15/443 |
| 10,035,410 B2* | 7/2018 | Taketomo | ............... | B60J 10/24 |
| 2005/0048263 A1* | 3/2005 | Ford | ............... | B60J 10/273 428/143 |
| 2005/0076574 A1* | 4/2005 | Nishihara | ............... | B60J 10/248 49/490.1 |
| 2006/0005471 A1* | 1/2006 | Yamada | ............... | B60J 10/24 49/490.1 |
| 2007/0251153 A1* | 11/2007 | Oba | ............... | B60J 10/24 49/498.1 |
| 2009/0001772 A1* | 1/2009 | Dosaki | ............... | B60J 10/24 296/216.09 |
| 2010/0077672 A1* | 4/2010 | Nozaki | ............... | B60J 10/24 49/483.1 |
| 2014/0197665 A1* | 7/2014 | Fukami | ............... | B60J 10/24 296/216.09 |
| 2015/0076856 A1* | 3/2015 | Masumoto | ............... | B60J 10/24 296/146.9 |

* cited by examiner

WEATHER STRIP FOR AUTOMOBILE

CROSS REFERENCE TO RELATED APPLICATION

This application claims the benefit under 35 USC § 119 of JP Patent Applications JP 2016-172897 filed Sep. 5, 2016, and JP 2017-153378 filed Aug. 8, 2017, the entire disclosure of which is incorporated herein by reference.

BACKGROUND INFORMATION

The present invention relates to weather strips for automobiles configured to operatively couple to flanges on peripheral edges of door openings of automobile bodies for sealing gaps between doors and bodies by making elastic contact with the doors.

As shown in FIG. 6 and FIG. 7, a weather strip 10 for an automobile has been configured to operatively couple to a peripheral edge 100 of an opening of an automobile body corresponding to a side door 200 (see, for example, Japanese unexamined Patent Publication No. H07-137583). The weather strip 10 for the automobile makes elastic contact with the side door 200 when the side door 200 is in a closed position.

As shown in FIG. 8, the weather strip 10 for the automobile includes an installation base member 11 and a hollow seal member 12 integrally molded with the installation base member 11. The installation base member 11 has a substantially U-shape cross section and is inserted over a flange 101 from an opening thereof. The flange 101 is formed along the peripheral edge 100 of the opening of the automobile body corresponding to the door 200. The hollow seal member 12 is provided on an outer-cabin side of the installation base member 11 and is configured to make elastic contact with the door 200 for sealing a gap between the door 200 and the body. The installation base member 11 has a core 13 buried therein.

The hollow seal member 12, which protrudes outwardly toward an exterior of the automobile, of the weather strip 10 for the automobile includes sponge material. On a region 130 (a region on the automobile body facing a lower rear side of a front door 200) in FIG. 7, parts of human bodies or luggage may rub against the hollow seal member 12 while passengers are getting in or getting off the automobiles. More specifically, clothes (such as trousers) may rub against the hollow seal member 12 for friction between the human bodies such as backs or hips and the hollow seal member 12. When the friction is larger between the human bodies and the hollow seal member 12, the hollow seal member 12 is worn away and finally damaged, with flaws or holes for example. Especially, a part of the hollow seal member 12, which abuts with the human bodies or the luggage while passengers are getting in or getting off the automobiles, is subjected to hard rub or abrasion, and therefore has to be fortified.

In this connection, it has been proposed to cover a whole surface of the hollow seal member 12 with a film which includes solid rubber material. Unfortunately, however, this configuration often causes folding wrinkles on the surface of the hollow seal member 12 and degrades door closability.

Also, Japanese unexamined Patent Publication No. H07-137583 discloses the hollow seal member 12 which includes the sponge rubber having specific gravity that falls within a range of 0.9±0.1 for improving abrasion-resistant property and preventing the folding wrinkles.

Unfortunately, however, the hollow seal member 12 of Japanese unexamined Patent Publication No. H07-137583 may still be damaged for insufficient strength against strong impact from the parts of human bodies 500 or the luggage. Specifically, while the specific gravity of the hollow seal member 12 of Japanese unexamined Patent Publication No. H07-137583 is higher than prior arts, the resultant hollow seal member 12 includes the sponge rubber in the same manner as the prior arts.

Measures against the abrasion also include covering the hollow seal member 12 with protective tape. But the protective tape is very expensive. Also, it takes a lot of time to arrange the protective tape, which lowers mass productivity.

In case of the weather strip, in which an end of an interior material is inserted between the installation base member 11 and the hollow seal member 12, the hollow seal member 12 is easily damaged. The interior material of this configuration extends outwardly from an interior of the automobile toward an exterior of the automobile. With this configuration, as the parts of human bodies 500 or the luggage come into contact with the hollow seal member 12, the hollow seal member 12, which is deformed, is strongly pressed against the end of the interior material. Since pressure concentrates on a point of contact of the hollow seal member 12 with the end of the interior material, the hollow seal member 12 is easily damaged.

Accordingly, an object of the present invention is to provide the weather strips for automobiles improved in the abrasion-resistant property of the hollow seal members.

SUMMARY

In order to achieve the above-mentioned object, according to one aspect of the invention, a weather strip (20) for an automobile is provided, the weather strip (20) including an installation base member (21) and a hollow seal member (22). The installation base member (21) is configured to operably couple to a flange (101) formed along a peripheral edge (100) of an opening of an automobile body corresponding to a door (200). The installation base member (21) has a substantially U-shaped cross section including an outer-cabin side wall (21a), an inner-cabin side wall (21b) and a connecting wall (21c) which connects the side walls (21a, 21b). The hollow seal member (22) protrudes outwardly toward an exterior of the automobile and is configured to make elastic contact with the door (200). The hollow seal member (22) includes a first base root (22a) and a second base root (22b). The first base root (22a) extends from the outer-cabin side wall (21a) of the installation base member (21) on a side of a top end (101a) of the flange (101). The second base root (22b) extends from the outer-cabin side wall (21a) of the installation base member (21) on a side of a base root (101b) of the flange (101). The hollow seal member (22) in cross section diagonally protrudes from the first base root (22a) outwardly toward the exterior of the automobile and toward the side of the top end (101a) of the flange (101) to a first turning point (60), which is an end of a part protruding from the first base root (22a), curves from the first turning point (60) outwardly toward the exterior of the automobile and toward the side of the base root (101b) of the flange (101), and connects with the second base root (22b). A side of the first base root (22a) of the hollow seal member (22) includes solid (dense) material. An interval between the first base root (22a) and the second base root (22b) includes sponge material. A first border (50) between the solid (dense) material of the side of the first base root (22a) and the sponge material is closer to the exterior of the automobile than the first turning point (60).

In addition, according to an aspect of the present invention, the first border (50) is on a position (90) closest to the exterior of the automobile of the hollow seal member (22).

In addition, according to an aspect of the present invention, a distance (120) between the first turning point (60) and the first border (50), which is closer to the exterior of the automobile than the first turning point (60), is same as a distance (120) between the first base root (22a) and the first turning point (60).

In addition, according to an aspect of the present invention, a film (30), which includes the solid (dense) material, covers a surface of the hollow seal member (22) and hardness of the film (30) is lower than hardness of the solid (dense) material of the side of the first base root (22a) and the side of the second base root (22b) of the hollow seal member (22).

In addition, according to an aspect of the present invention, a space is formed between the outer-cabin side wall (21a) and a part of the hollow seal member (22) between the first base root (22a) and the first turning point (60), and an end (40a) of an interior material (40) is inserted in the space.

In addition, according to an aspect of the present invention, the side of the first base root (22a) of the hollow seal member (22) and the installation base member (21) include the same solid (dense) material and the side of the first base root (22a) is formed on the installation base member (21) continuously and integrally.

In addition, in order to achieve the above-mentioned object, according to one aspect of the invention, a weather strip (20) for an automobile is provided, the weather strip (20) including an installation base member (21) and a hollow seal member (22). The installation base member (21) is configured to operably couple to a flange (101) formed along a peripheral edge (100) of an opening of an automobile body corresponding to a door (200). The installation base member (21) has a substantially U-shaped cross section including an outer-cabin side wall (21a), an inner-cabin side wall (21b) and a connecting wall (21c) which connects the side walls (21a, 21b). The hollow seal member (22) protrudes outwardly toward an exterior of the automobile and is configured to make elastic contact with the door (200). The hollow seal member (22) includes a first base root (22a) and a second base root (22b). The first base root (22a) extends from the outer-cabin side wall (21a) of the installation base member (21) on a side of a top end (101a) of the flange (101). The second base root (22b) extends from the outer-cabin side wall (21a) of the installation base member (21) on a side of a base root (101b) of the flange (101). The hollow seal member (22) in cross section diagonally protrudes from the first base root (22a) outwardly toward the exterior of the automobile and toward the side of the top end (101a) of the flange (101) to a first turning point (60), which is an end of a part protruding from the first base root (22a), curves from the first turning point (60) outwardly toward the exterior of the automobile and toward the side of the base root (101b) of the flange (101), and connects with the second base root (22b). A side of the first base root (22a) of the hollow seal member (22) includes a first material. An interval between the first base root (22a) and the second base root (22b) includes a second material which is more flexible than the first material. A first border (50) between the first material of the side of the first base root (22a) and the second material is closer to the exterior of the automobile than the first turning point (60). The side of the first base root (22a) of the hollow seal member (22) and the installation base member (21) include the same first material, and the side of the first base root (22a) is formed on the installation base member (21) continuously and integrally.

In addition, according to an aspect of the present invention, the first material includes a rubber like elastic body which has hardness of not less than 40 measured with JIS K 6253 of Japanese Industrial Standards (JIS), durometer type A, and the second material includes a rubber like elastic body which has the hardness of less than 40 measured with JIS K 6253, durometer type A.

The "solid (dense) material" according to the present invention includes materials high in rigidity to some extent even with bubbles therein as well as materials without bubbles therein. More specifically, the solid (dense) material includes the rubber like elastic body of which expansion ratio is less than 1.7 times. In case of EPDM rubber, which has a filler such as carbon black added therein, for use as the solid (dense) material has specific gravity of more than 0.7.

The "sponge material" according to the present invention includes materials which are flexible and with bubbles therein. More specifically, the sponge material includes the rubber like elastic body of which expansion ratio is not less than 1.7 times. In case of EPDM rubber, which has the filler such as carbon black added therein, for use as the sponge material has the specific gravity of not more than 0.7.

According to one aspect of the invention, the interval between the first base root and the second base root of the hollow seal member includes the sponge material, and the side of the first base root includes the solid (dense) material. The material of the second base root is not specifically limited and may include the solid (dense) material, the sponge material or other materials.

The "rubber like elastic body" according to the present invention includes materials with elasticity. Examples of the rubber like elastic body include the aforementioned rubber and thermoplastic elastomer.

According to one aspect of the invention, the interval between the first base root and the second base root of the hollow seal member includes the second material, and the side of the first base root includes the first material. The material of the side of the second base root is not specifically limited and may include the second material, the first material or other materials.

Symbols in parentheses show constituents or items corresponding to the drawings.

According to the present invention, the side of the first base root of the hollow seal member includes the solid (dense) material, the interval between the first base root and the second base root includes the sponge material and the first border between the solid (dense) material of the side of the first base root and the sponge material is closer to the exterior of the automobile than the first turning point. The first base root and the second base root of the hollow seal member extend from the outer-cabin side wall of the installation base member which has the substantially U-shaped cross section. The hollow seal member, which protrudes outwardly toward the exterior of the automobile, in cross section diagonally protrudes from the first base root outwardly toward the exterior of the automobile and toward the side of the top end of the flange to the first turning point which is the end of the part protruding from the first base root, curves from the first turning point outwardly toward the exterior of the automobile and toward the side of the base root of the flange, and connects with the second base root. This configuration widens a range which includes the solid (dense) material of the hollow seal member as compared with a configuration that only the side of the first base root and the side of the second base root include the solid (dense) material.

This configuration enables formation of a part of the hollow seal member, against which parts of human bodies or luggage often rub while passengers are getting in or getting off the automobiles, with the solid (dense) material. Accordingly, this configuration remarkably improves durability of the hollow seal member and prevents damages on the hollow seal member, as compared with the hollow seal members which consist of the sponge material. In addition, since the hollow seal member as a whole does not include the solid (dense) material, folding wrinkles hardly appear on the surface of the hollow seal member. Further, the part including the solid (dense) material is increased in section density and is improved in sound insulation performance as a side effect.

Especially, with the configuration that the first border between the solid (dense) material of the side of the first base root and the sponge material is on the position closest to the exterior of the automobile of the hollow seal member such that the part of the hollow seal member, which requires protection, includes the solid (dense) material, the hollow seal member performs the durability most effectively. Alternatively, with the configuration that the distance between the first turning point and the first border which is closer to the exterior of the automobile than the first turning point is the same as the distance between the first base root and the first turning point, the hollow seal member sufficiently performs the effect.

In addition, with the configuration that the film which includes the solid (dense) material covers the surface of the hollow seal member and the hardness of the film is lower than the hardness of the solid (dense) material of the side of the first base root and the side of the second base root, the durability of the hollow seal member improves more.

In addition, the space is formed between the outer-cabin side wall and the part of the hollow seal member between the first base root and the first turning point, and the end of the interior material is inserted in the space. In case the parts of human bodies or the luggage rub against the hollow seal member, the hollow seal member is partially pressed against the end of the interior material strongly and is easily damaged. Accordingly, it is very effective to protect the part of the weather strip for the automobile as configured above, with which the parts of human bodies or luggage often abut, with the solid (dense) material.

In addition, the side of the first base root of the hollow seal member and the installation base member include the same first material high in hardness and the side of the first base root is formed on the installation base member continuously and integrally, the interval between the first base root and the second base root includes the second material which is softer and lower in the hardness than the first material, and the first border between the first material of the side of the first base root and the second material is closer to the exterior of the automobile than the first turning point. This configuration widens a range which includes the first material of the hollow seal member as compared with a configuration that only the side of the first base root includes the first material.

This configuration enables formation of a part of the hollow seal member, against which parts of human bodies or luggage often rub while passengers are getting in or getting off the automobiles, with the first material. The first material is high in the hardness and the installation base member includes the same first material. Accordingly, this configuration remarkably improves durability of the hollow seal member and prevents damages on the hollow seal member, as compared with the hollow seal members which consist of the second material low in the hardness. In addition, since the hollow seal member as a whole does not include the first material, folding wrinkles hardly appear on the surface of the hollow seal member. Further, the part including the first material is increased in the section density and is improved in the sound insulation performance as the side effect.

The hollow seal member especially performs effects with the configuration that the first material includes the rubber like elastic body which has the hardness of not less than 40 measured with JIS K 6253, durometer type A, and the second material includes the rubber like elastic body which has the hardness of less than 40 measured with JIS K 6253, durometer type A.

DETAILED DESCRIPTION

Figure 1:
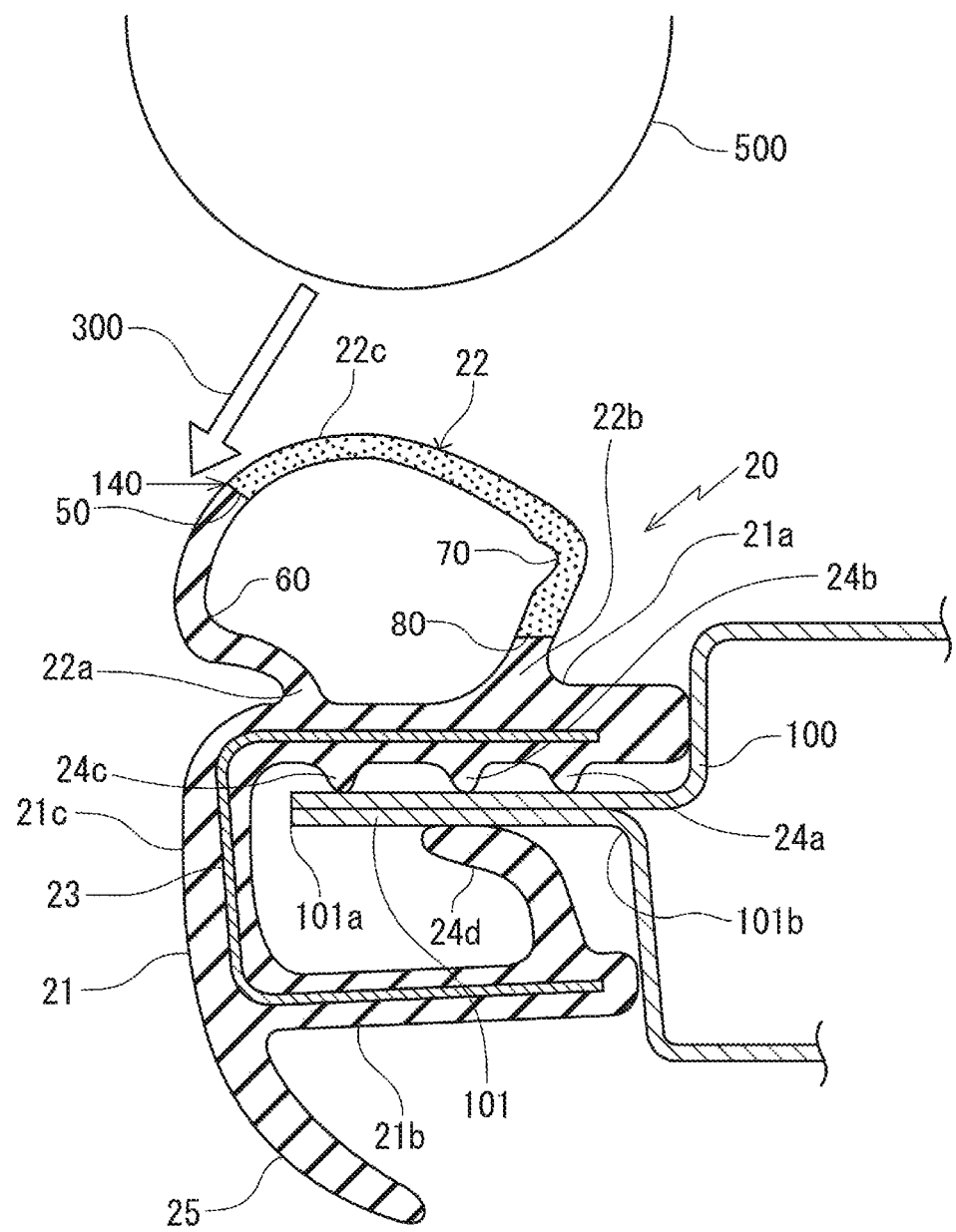
FIG. 1 is an I-I line enlarged cross section of FIG. 7, illustrating a weather strip according to an embodiment of the present invention for an automobile.
Figure 6:
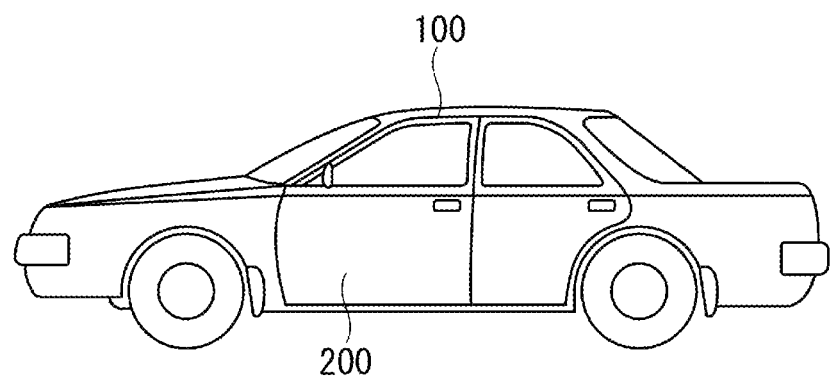
FIG. 6 is a side view of an outward appearance of an automobile.
Figure 7:
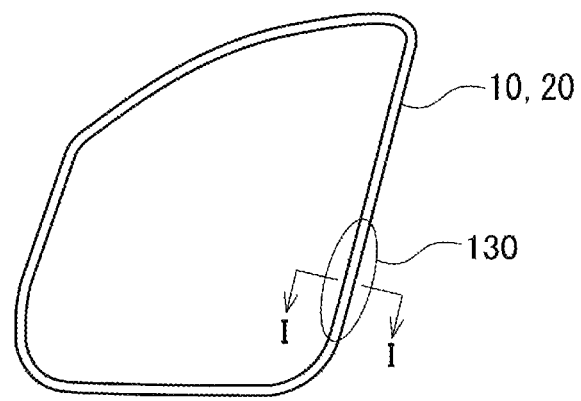
FIG. 7 is an enlarged side view of a weather strip for an automobile configured to operably couple to a door opening of an automobile body of FIG. 6.

Referring to FIGS. 1, 6 and 7, a weather strip according to an embodiment of the present invention for an automobile will be described. When constituents or items correspond to those in prior arts (FIG. 8), the same symbols are used.

A weather strip 20 according to an embodiment of the present invention for an automobile is configured to operatively couple to a flange 101 formed along a peripheral edge 100 of an opening of an automobile body corresponding to a front door 200. The weather strip 20 for the automobile includes an installation base member 21 and a hollow seal member 22. The hollow seal member 22 is integrally molded with the installation base member 21 and configured to make elastic contact with the front door 200 when the front door 200 is in a closed position.

The installation base member 21 has a substantially U-shaped cross section including an outer-cabin side wall 21a, an inner-cabin side wall 21b and a connecting wall 21c which connects the side walls 21a, 21b. The installation base member 21 has a core 23 (which includes metal or resin) buried therein.

A plurality of protrusions 24a, 24b, 24c, 24d are formed on an inner-cabin side of the outer-cabin side wall 21a and an outer-cabin side of the inner-cabin side wall 21b, and make elastic contact with both surfaces of the flange 101 over which the installation base member 21 is inserted. In the present embodiment, three protrusions 24a, 24b, 24c are formed on the outer-cabin side wall 21a and a large protrusion 24d, which is larger than the protrusions 24a, 24b, 24c, is formed on the inner-cabin side wall 21b. But the protrusions are not strictly limited in number, size or shape as long as the protrusions stably hold the flange 101.

A decorative lip 25 is formed on a connecting part between the inner-cabin side wall 21b and the connecting wall 21c. The decorative lip 25 has a substantially tongue-shaped cross section.

The hollow seal member 22 has a first base root 22a and a second base root 22b, which are spaced apart from each other and extend from an outer-cabin side of the outer-cabin side wall 21a of the installation base member 21. The hollow seal member 22 protrudes outwardly toward an exterior of the automobile.

The first base root 22a extends from the outer-cabin side wall 21a on a side of a top end 101a of the flange 101 and the second base root 22b extends from the outer-cabin side wall 21a on a side of a base root 101b of the flange 101, which is a side opposite to the side of the top end 101a of the flange 101.

The hollow seal member 22 in cross section diagonally protrudes from the first base root 22a outwardly toward the exterior of the automobile and toward the side of the top end 101a of the flange 101 to a first turning point 60, which is an end of a part protruding from the first base root 22a, curves from the first turning point 60 outwardly toward the exterior of the automobile and toward the side of the base root 101b of the flange 101, and connects with the second base root 22b. On a side of the second base root 22b of the hollow seal member 22 in cross section, the hollow seal member 22 diagonally protrudes from the second base root 22b outwardly toward the exterior of the automobile and toward the side of the base root 101b of the flange 101 to a second turning point 70, which is an end of a part protruding from second base root 22b.

More specifically, the first base root 22a and the second base root 22b of the hollow seal member 22 in cross section diagonally extend and are spaced apart from each other, gradually widened in other words. One end on an outer side of a curved part 22c, which curves outwardly toward the exterior of the automobile, connects with the first base root 22a. Another end on an inner side of the curved part 22c connects with the second base root 22b. The hollow seal member 22 has a shape of a pantograph in cross section, in which the first turning point 60 (the side of the top end 101a of the flange 101) and the second turning point 70 (the side of the base root 101b of the flange 101) are spaced apart from each other.

The side of the first base root 22a and the side of the second base root 22b of the hollow seal member 22 include solid (dense) material. An interval between the side of the first base root 22a and the side of the second base root 22b, which is a side of the curved part 22c, includes sponge material. A first border 50 between the solid (dense) material of the side of the first base root 22a and the sponge material is closer to the exterior of the automobile than the first turning point 60. More specifically, the first border 50 is on a position 140, which is slightly closer (5 mm in the present embodiment) to the side of the curved part 22c than the first turning point 60.

A second border 80 between the solid (dense) material of the side of the second base root 22b and the sponge material is closer to an interior of the automobile than the second turning point 70. This configuration is the same as ordinary weather strips for automobiles.

Examples of the solid (dense) material of the hollow seal member 22 include EPDM rubber and thermoplastic elastomer. In the present embodiment, the hollow seal member 22 and the installation base member 21 include the same solid (dense) material which has hardness 70 degrees JISA of Japanese Industrial Standards (JIS).

The side of the first base root 22a of the hollow seal member 22 and the installation base member 21 include the same solid (dense) material and the side of the first base root 22a is formed on the installation base member 21 continuously and integrally. Accordingly, the side of the first base root 22a and the installation base member 21 have the configuration that the same solid (dense) material is extended toward the side of the first base root 22a of the hollow seal member 22 from installation base member 21. The side of the second base root 22b of the hollow seal member 22 and the installation base member 21 include the same solid (dense) material and the side of the second base root 22b is formed on the installation base member 21 continuously and integrally. Accordingly, the side of the second base root 22b and the installation base member 21 have the configuration that the same solid (dense) material is extended toward the side of the second base root 22b of the hollow seal member 22 from installation base member 21.

The "solid (dense) material" according to the embodiment of the present invention includes materials high in rigidity to some extent even with bubbles therein as well as materials without bubbles therein. More specifically, the solid (dense) material includes the rubber like elastic body of which expansion ratio is less than 1.7 times. In case of EPDM rubber, which has a filler such as carbon black added therein, for use as the solid (dense) material has specific gravity of more than 0.7.

The "sponge material" according to the embodiment of the present invention includes materials which are flexible and with bubbles therein. More specifically, the sponge material includes the rubber like elastic body of which expansion ratio is not less than 1.7 times. In case of EPDM rubber, which has the filler such as carbon black added therein, for use as the sponge material has the specific gravity of not more than 0.7.

The "rubber like elastic body" according to the embodiment of the present invention includes materials with elasticity. Examples of the rubber like elastic body include the aforementioned rubber and thermoplastic elastomer.

According to the weather strip 20 according to the embodiment of the present invention for the automobile, the hollow seal member 22 as a whole, which protrudes outwardly toward the exterior of the automobile, does not include solely the solid (dense) material or solely the sponge material. That is, the side of the first base root 22a and the side of the second base root 22b of the hollow seal member 22 include the solid (dense) material, the interval between the side of the first base root 22a and the side of the second base root 22b includes the sponge material, and the first border 50 between the solid (dense) material of the side of the first base root 22a and the sponge material is closer to the exterior of the automobile than the first turning point 60. This configuration widens a range which includes the solid (dense) material of the hollow seal member 22 as compared with a configuration that only the side of the first base root 22a and the side of the second base root 22b include the solid (dense) material.

This configuration enables formation of a part of the hollow seal member 22, against which parts of human bodies 500 (backs or hips) or luggage often rub as shown by an arrow 300 in FIG. 1 while passengers are getting in or getting off the automobiles, with the solid (dense) material. Accordingly, this configuration remarkably improves durability of the hollow seal member 22 and prevents damages on the hollow seal member 22, as compared with hollow seal members which consist of the sponge material. In addition, since the hollow seal member 22 as a whole does not include the solid (dense) material, folding wrinkles hardly appear on the surface of the hollow seal member 22. Further, the part including the solid (dense) material is increased in section density and is improved in sound insulation performance as a side effect.

Figure 2:
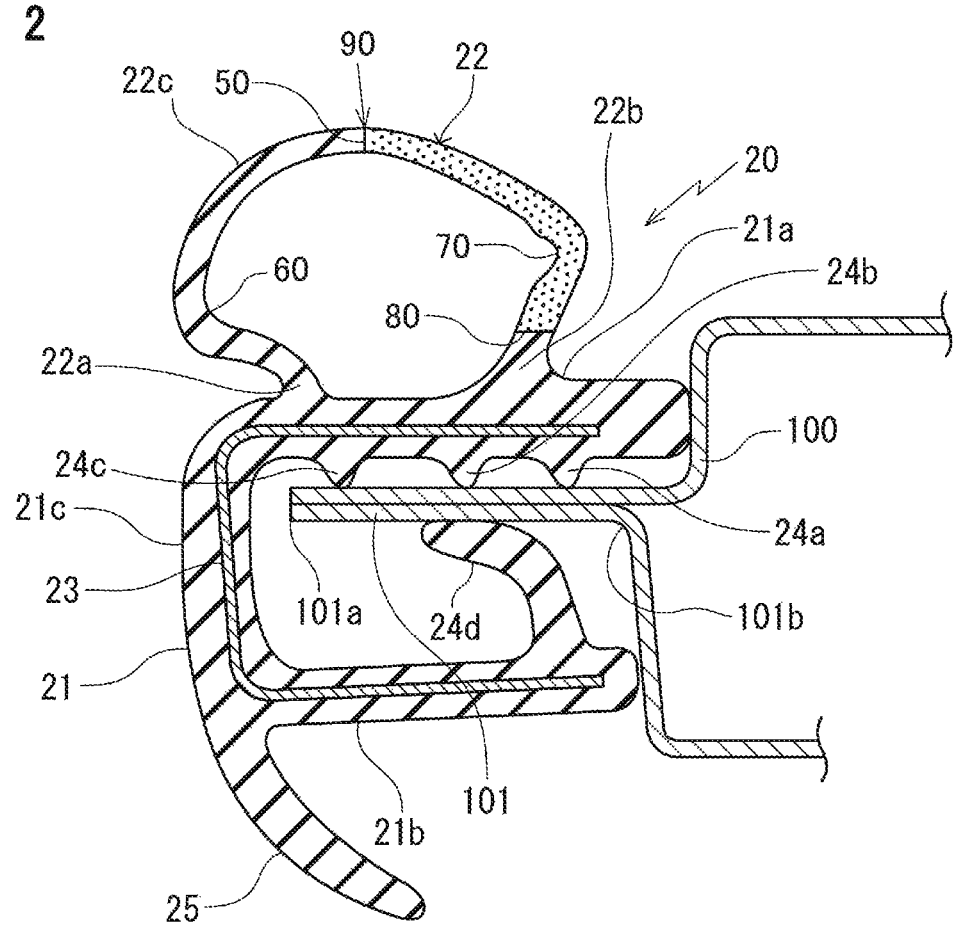
FIG. 2 is the I-I line enlarged cross section of FIG. 7, illustrating another weather strip according to the embodiment of the present invention for the automobile.

In the present embodiment, the first border 50 between the solid (dense) material of the side of the first base root 22a and the sponge material is on the position 140, which is slightly closer to the exterior of the automobile than the first turning point 60. Alternatively, as shown in FIG. 2, the first border 50 may be on a position 90 closest to the exterior of the automobile of the hollow seal member 22.

With this configuration, the part of the hollow seal member 22, against which parts of human bodies 500 (backs or hips) or luggage often rub while passengers are getting in or getting off the automobiles and therefore requires protection, includes the solid (dense) material and the other part of the hollow seal member 22 includes the sponge material. Accordingly, the hollow seal member 22 performs the durability most effectively.

Figure 3:
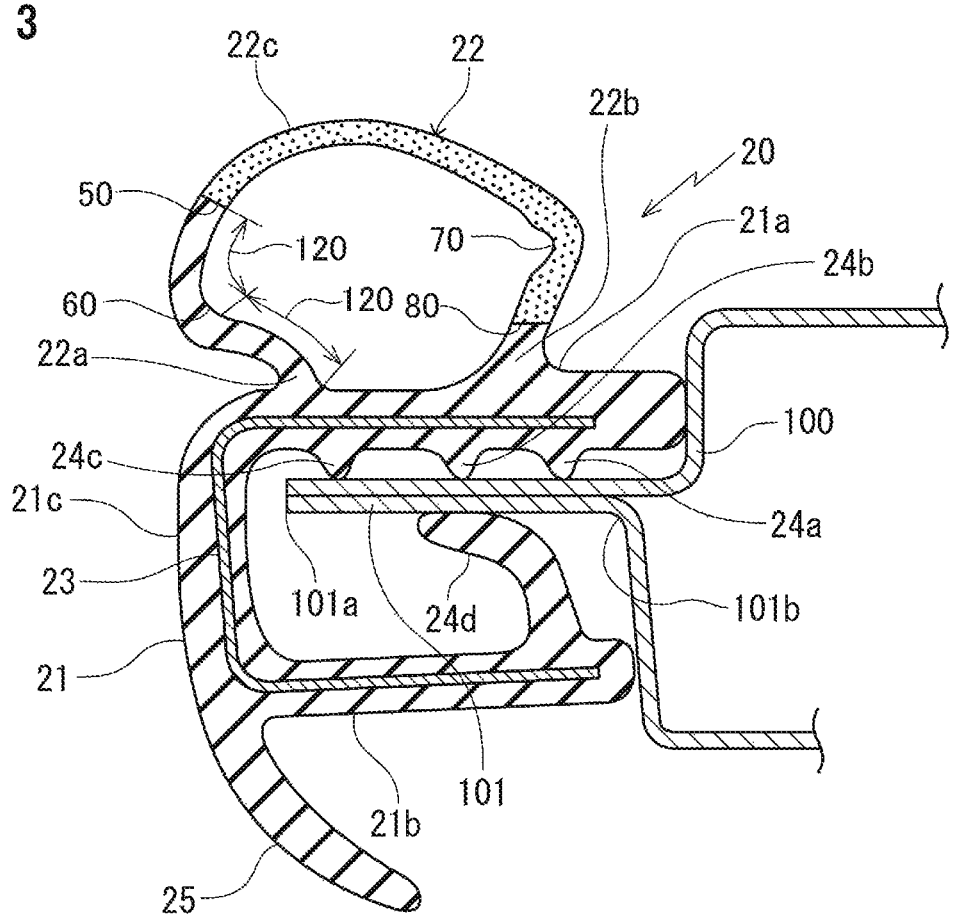
FIG. 3 is the I-I line enlarged cross section of FIG. 7, illustrating still another weather strip according to the embodiment of the present invention for the automobile.

Alternatively, as shown in FIG. 3, with the configuration that a distance between the first turning point 60 and the first border 50, which is closer to the exterior of the automobile than the first turning point 60, is the same as a distance between the first base root 22a and the first turning point 60, the hollow seal member 22 sufficiently performs the effect.

Figure 4:
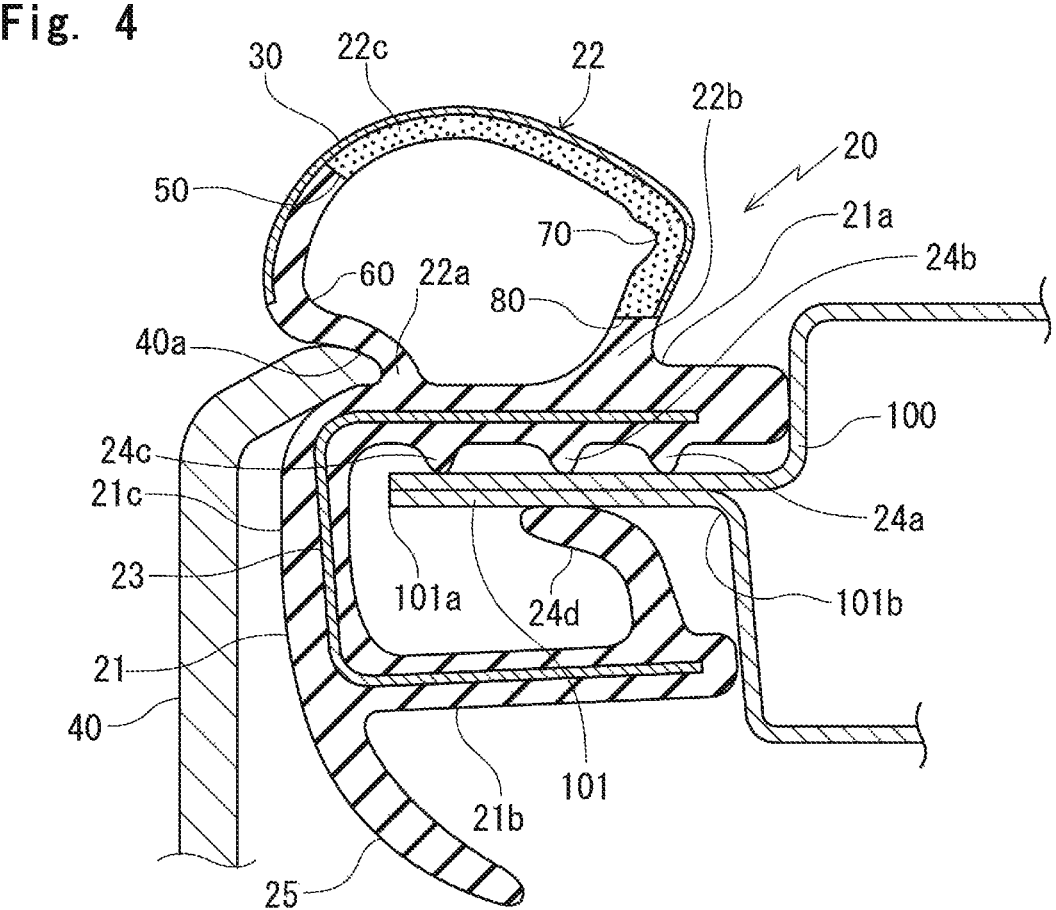
FIG. 4 is the I-I line enlarged cross section of FIG. 7, illustrating still another weather strip according to the embodiment of the present invention for the automobile.

Alternatively, as shown in FIG. 4, with the configuration that a film 30, which includes the solid (dense) material, covers a surface of the hollow seal member 22 and hardness of the film 30 is lower than hardness of the solid (dense) material of the side of the first base root 22a and the side of the second base root 22b, the durability of the hollow seal member 22 improves more.

In the present embodiment, the film 30 has the hardness 50 degrees JISA and the solid (dense) material for the hollow seal member 22 has the hardness 70 degrees JISA.

FIG. 4 illustrates that an end of the film 30 on the side of the second base root 22b is adjacent to the second border 80. In case this configuration degrades door closability, the end of the film 30 on the side of the second base root 22b may be adjacent to the second turning point 70, against which parts of human bodies 500 (backs or hips) or luggage hardly rub.

Alternatively, the second base root 22b may include the flexible sponge material of the hollow seal member 22. In other words, the second base root 22b, which includes the flexible sponge material, may be formed on the hollow seal member 22, which includes the same flexible sponge material, continuously and integrally.

FIG. 4 illustrates an example of the weather strip 20 for the automobile configured to operably couple to the flange 101. In the weather strip 20 for the automobile of FIG. 4, a space is formed between the outer-cabin side wall 21a and a part of the hollow seal member 22 between the first base root 22a and the first turning point 60, and an end 40a of an interior material 40 is inserted in the space.

In case the parts of human bodies 500 or the luggage rub against the hollow seal member 22, the hollow seal member 22 is partially pressed against the end 40a of the interior material 40 strongly and is easily damaged. Accordingly, it is very effective to protect the part of weather strip 20 for the automobile of FIG. 4, with which the parts of human bodies 500 or luggage often abut, with the solid (dense) material.

In FIG. 1 to FIG. 4, the first border 50 is substantially perpendicular to a visible outline of the hollow seal member 22. Alternatively, as shown in FIG. 5, the first border 50 may form an acute angle and may be substantially diagonal with respect to the visible outline of the hollow seal member 22.

Figure 5:
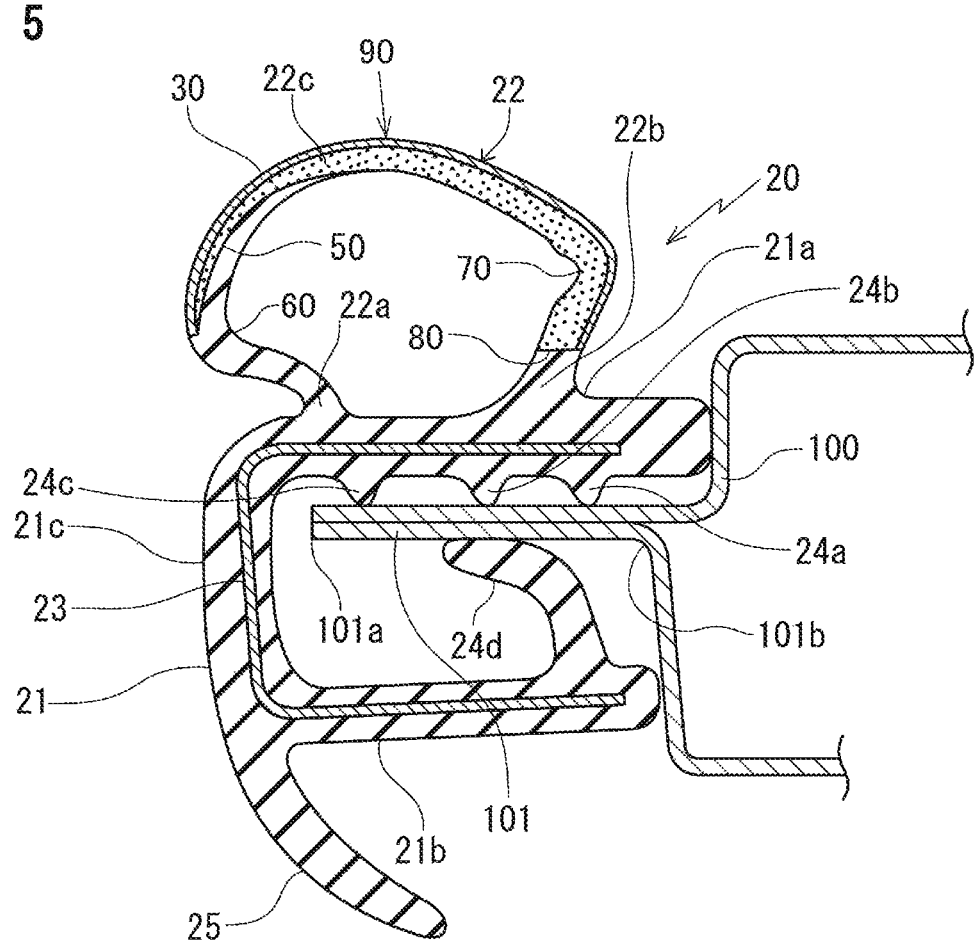
FIG. 5 is the I-I line enlarged cross section of FIG. 7, illustrating still another weather strip according to the embodiment of the present invention for the automobile.

In FIG. 5, an end of the first border 50 on a side of an outer surface of the hollow seal member 22 is slightly closer to the exterior of the automobile than the first turning point 60 and an end of the first border 50 on a side of an inner surface of the hollow seal member 22 is adjacent to the position 90 closest to the exterior of the automobile of the hollow seal member 22.

In FIG. 1 to FIG. 4, on the front and the rear of the first border 50, rigidity of the hollow seal member 22 suddenly turns. In FIG. 5, on the front and the rear of the first border 50, the rigidity of the hollow seal member 22 gradually turns and therefore, this configuration further improves abrasion-resistant property of the hollow seal member 22.

Results of abrasion-resistant property test are shown below.

Specifically, the abrasion-resistant property was tested by rubbing the surface of the hollow seal member 22 with a 3 kg abrasion factor (surface of which is jeans) at a speed of 30 times/minute for 10000 times to count number of rubs before the hollow seal member 22 begins to be worn away.

The following is the results.

Figure 8:
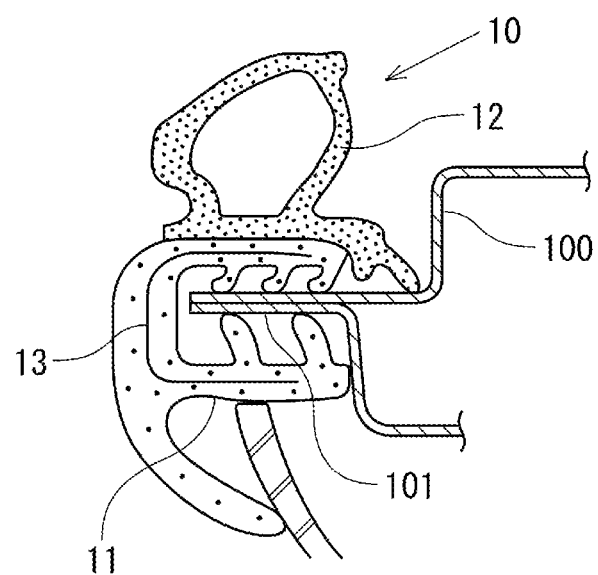
FIG. 8 is an I-I line enlarged cross section of FIG. 7, illustrating a weather strip according to a prior art for an automobile.

| Results | | |
|---|---|---|
| Embodiments | FIG. 1 | no abrasion by $10000^{th}$ rub |
|  | FIG. 2 | no abrasion by $10000^{th}$ rub |
|  | FIG. 3 | no abrasion by $10000^{th}$ rub |
|  | FIG. 4 | no abrasion by $10000^{th}$ rub |
|  | FIG. 5 | no abrasion by $10000^{th}$ rub |
| Comparative Example | FIG. 8 | tear (hole) on $500^{th}$ rub |

In the present embodiment, the side of the first base root 22a and the side of the second base root 22b of the hollow seal member 22 include the solid (dense) material and the interval between the side of the first base root 22a and the side of the second base root 22b includes the sponge material such that variation in the specific gravity between the solid (dense) material and the sponge material divides the hollow seal member 22. Alternatively, the hardness may divide the hollow seal member 22, not the specific gravity.

More specifically, the side of the first base root 22a and the side of the second base root 22b of the hollow seal member 22 include the first material high in the hardness, the interval between the side of the first base root 22a and the side of the second base root 22b includes the second material which is more flexible and lower in the hardness than the first material, and the first border 50 between the first material of the side of the first base root 22a and the second material is closer to the exterior of the automobile than the first turning point 60. The side of the first base root 22a of the hollow seal member 22 and the installation base member 21 include the same first material, and the side of the first base root 22a is formed on the installation base member 21 continuously and integrally.

The second base root 22*b* may include the material different from the material of the first base root 22*a*. Examples of the material of the second base root 22*b* include the flexible second material of the hollow seal member 22 such that the second base root 22*b* is formed on the hollow seal member 22 continuously and integrally.

Examples of the first material include the rubber like elastic body which has the hardness of not less than 40 measured with JIS K 6253, durometer type A. Examples of the second material include the rubber like elastic body which has the hardness of less than 40 measured with JIS K 6253, durometer type A.

This configuration widens a range which includes the first material of the hollow seal member 22, which protrudes outwardly toward the exterior of the automobile, as compared with a configuration that only the side of the first base root 22*a* and the side of the second base root 22*b* include the first material.

This configuration enables formation of a part of the hollow seal member 22, against which parts of human bodies or luggage often rub while passengers are getting in or getting off the automobiles, with the first material. The first material is high in the hardness and the installation base member 21 includes the same first material. Accordingly, this configuration remarkably improves durability of the hollow seal member 22 and prevents damages on the hollow seal member 22, as compared with the hollow seal members which consist of the second material low in the hardness. In addition, since the hollow seal member 22 as a whole does not include the first material, folding wrinkles hardly appear on the surface of the hollow seal member 22. Further, the part including the first material is increased in section density and is improved in the sound insulation performance as the side effect.

I claim:

1. A weather strip for an automobile, the weather strip comprising:
    an installation base member configured to operably couple to a flange formed along a peripheral edge of an opening of an automobile body corresponding to a door, the installation base member having a substantially U-shaped cross section including an outer-cabin side wall, an inner-cabin side wall and a connecting wall which connects the side walls; and
    a hollow seal member configured to protrude outwardly toward an exterior of the automobile, the hollow seal member being configured to make elastic contact with said door, and the hollow seal member including:
    a first base root which extends from the outer-cabin side wall of said installation base member on a side of a top end of the flange; and
    a second base root which extends from said outer-cabin side wall on a side of a base root of the flange,
    wherein said hollow seal member, in cross section, diagonally protrudes from said first base root outwardly toward the exterior of the automobile and toward the side of the top end of the flange to a first turning point which is an end of a part protruding from the first base root, curves from the first turning point outwardly toward the exterior of the automobile and toward the side of the base root of the flange, and connects with said second base root, and
    wherein a side of the first base root of said hollow seal member comprises solid material, an interval between the first base root and the second base root comprises sponge material, and a first border between the solid material of the side of said first base root and the sponge material is closer to the exterior of the automobile than said first turning point.

2. The weather strip for the automobile as claimed in claim 1, wherein said first border is on a position closest to the exterior of the automobile of said hollow seal member.

3. The weather strip for the automobile as claimed in claim 2, wherein a film which comprises the solid material covers a surface of said hollow seal member and a hardness of said film is lower than a hardness of the solid material of the side of the first base root and a side of the second base root of said hollow seal member.

4. The weather strip for the automobile as claimed in claim 3, wherein a space is formed between said outer-cabin side wall and a part of said hollow seal member between said first base root and said first turning point, the space being configured to have an end of an interior material inserted therein.

5. The weather strip for the automobile as claimed in claim 2, wherein a space is formed between said outer-cabin side wall and a part of said hollow seal member between said first base root and said first turning point, the space being configured to have an end of an interior material inserted therein.

6. The weather strip for the automobile as claimed in claim 1, wherein a distance between said first turning point and said first border which is closer to the exterior of the automobile than the first turning point is the same as a distance between said first base root and said first turning point.

7. The weather strip for the automobile as claimed in claim 6, wherein a film which comprises the solid material covers a surface of said hollow seal member and a hardness of said film is lower than a hardness of the solid material of the side of the first base root and a side of the second base root of said hollow seal member.

8. The weather strip for the automobile as claimed in claim 6, wherein a space is formed between said outer-cabin side wall and a part of said hollow seal member between said first base root and said first turning point, the space being configured to have an end of an interior material inserted therein.

9. The weather strip for the automobile as claimed in claim 1, wherein a film which comprises the solid material covers a surface of said hollow seal member and a hardness of said film is lower than a hardness of the solid material of the side of the first base root and a side of the second base root of said hollow seal member.

10. The weather strip for the automobile as claimed in claim 9, wherein a space is formed between said outer-cabin side wall and a part of said hollow seal member between said first base root and said first turning point, the space being configured to have an end of an interior material inserted therein.

11. The weather strip for the automobile as claimed in claim 1, wherein a space is formed between said outer-cabin side wall and a part of said hollow seal member between said first base root and said first turning point, the space being configured to have an end of an interior material inserted therein.

12. The weather strip for the automobile as claimed in claim 1, wherein the side of the first base root of said hollow seal member comprises the solid material which is the same as a solid material of said installation base member, and the side of the first base root is formed on said installation base member continuously and integrally.

13. The weather strip for the automobile as claimed in claim 1, wherein said first border extends diagonally to form an acute angle with respect to an outer surface of the hollow seal member.

14. The weather strip for the automobile as claimed in claim 13, wherein said first border extends diagonally from (i) a first position adjacent to said first turning point, to (ii) a second position that is on a side of an inner surface of the hollow seal member and is adjacent to a position closest to the exterior of the automobile of said hollow seal member.

15. The weather strip for the automobile as claimed in claim 1, wherein said solid material and said sponge material are provided side by side and overlapping with each other along a portion of said interval.

16. A weather strip for an automobile, the weather strip comprising:
- an installation base member configured to operably couple to a flange formed along a peripheral edge of an opening of an automobile body corresponding to a door, the installation base member having a substantially U-shaped cross section including an outer-cabin side wall, an inner-cabin side wall and a connecting wall which connects the side walls; and
- a hollow seal member configured to protrude outwardly toward an exterior of the automobile, the hollow seal member being configured to make elastic contact with said door, and the hollow seal member including:
- a first base root which extends from the outer-cabin side wall of said installation base member on a side of a top end of the flange; and
- a second base root which extends from said outer-cabin side wall on a side of a base root of the flange,
- wherein said hollow seal member, in cross section, diagonally protrudes from said first base root outwardly toward the exterior of the automobile and toward the side of the top end of the flange to a first turning point which is an end of a part protruding from the first base root, curves from the first turning point outwardly toward the exterior of the automobile and toward the side of the base root of the flange, and connects with said second base root,
- wherein a side of the first base root of said hollow seal member includes a first material, an interval between said first base root and said second base root includes a second material which is more flexible than said first material, and a first border between said first material of the side of said first base root and said second material is closer to the exterior of the automobile than said first turning point, and
- wherein the side of the first base root of said hollow seal member includes said first material which is the same as a material of said installation base member, and the side of the first base root is formed on said installation base member continuously and integrally.

17. The weather strip for the automobile as claimed in claim 16, wherein said first material comprises a rubber like elastic body which has a hardness of not less than 40 measured with JIS K 6253, durometer type A, and said second material comprises a rubber like elastic body which has a hardness of less than 40 measured with JIS K 6253, durometer type A.

18. The weather strip for the automobile as claimed in claim 16, wherein said first border extends diagonally to form an acute angle with respect to an outer surface of the hollow seal member.

19. The weather strip for the automobile as claimed in claim 18, wherein said first border extends diagonally from (i) a first position adjacent to said first turning point, to (ii) a second position that is on a side of an inner surface of the hollow seal member and is adjacent to a position closest to the exterior of the automobile of said hollow seal member.

20. The weather strip for the automobile as claimed in claim 16, wherein said solid material and said sponge material are provided side by side and overlapping with each other along a portion of said interval.

* * * * *